Figure 1:
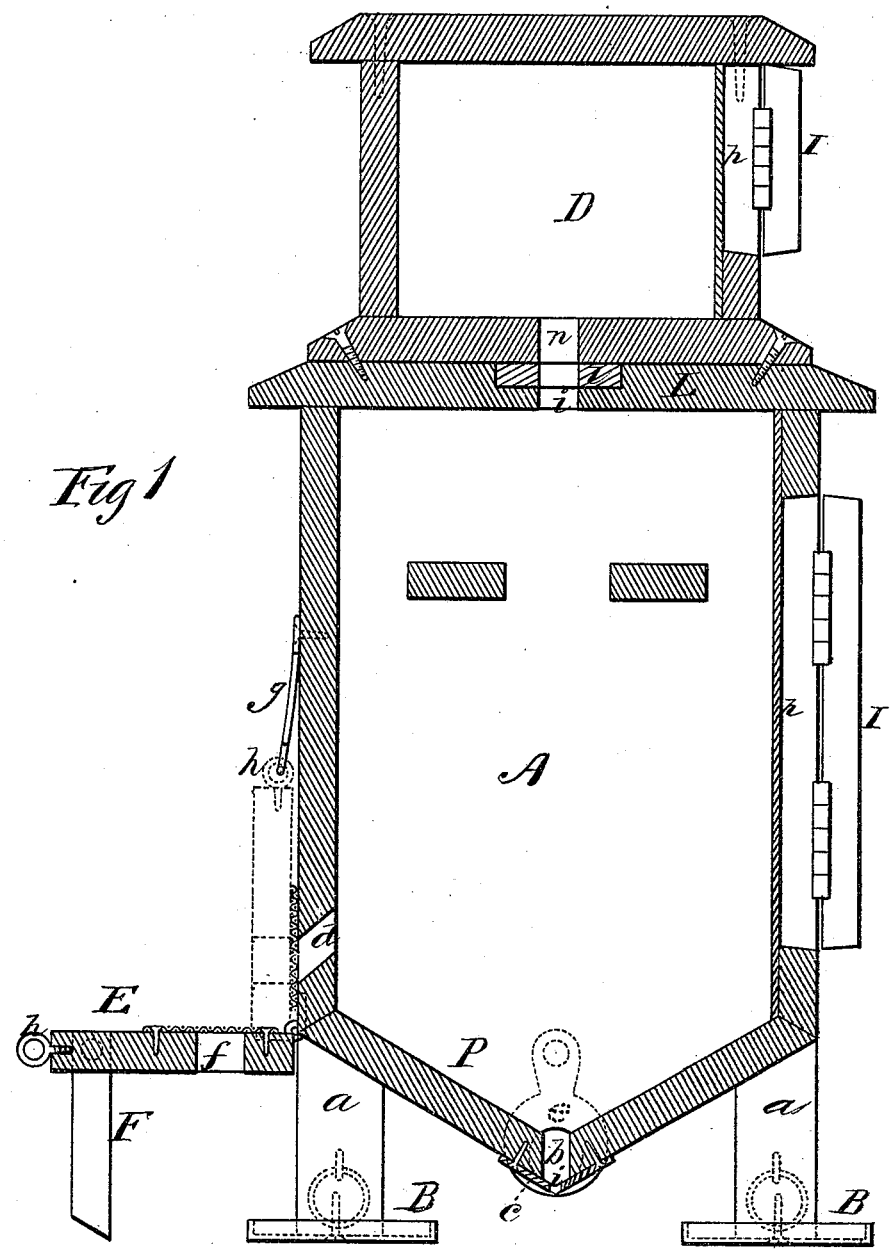

C. M. JONES.
BEE HIVE.

No. 180,596.

2 Sheets—Sheet 1.

Patented Aug. 1, 1876.

WITNESSES
Villette Anderson.
E. H. Bates

INVENTOR
Charles M. Jones
Chapman Hosmer & Co.
ATTORNEYS

N. PETERS, PHOTO-LITHOGRAPHER, WASHINGTON, D. C.

C. M. JONES.
BEE HIVE.
No. 180,596.
2 Sheets—Sheet 2.
Patented Aug. 1, 1876.
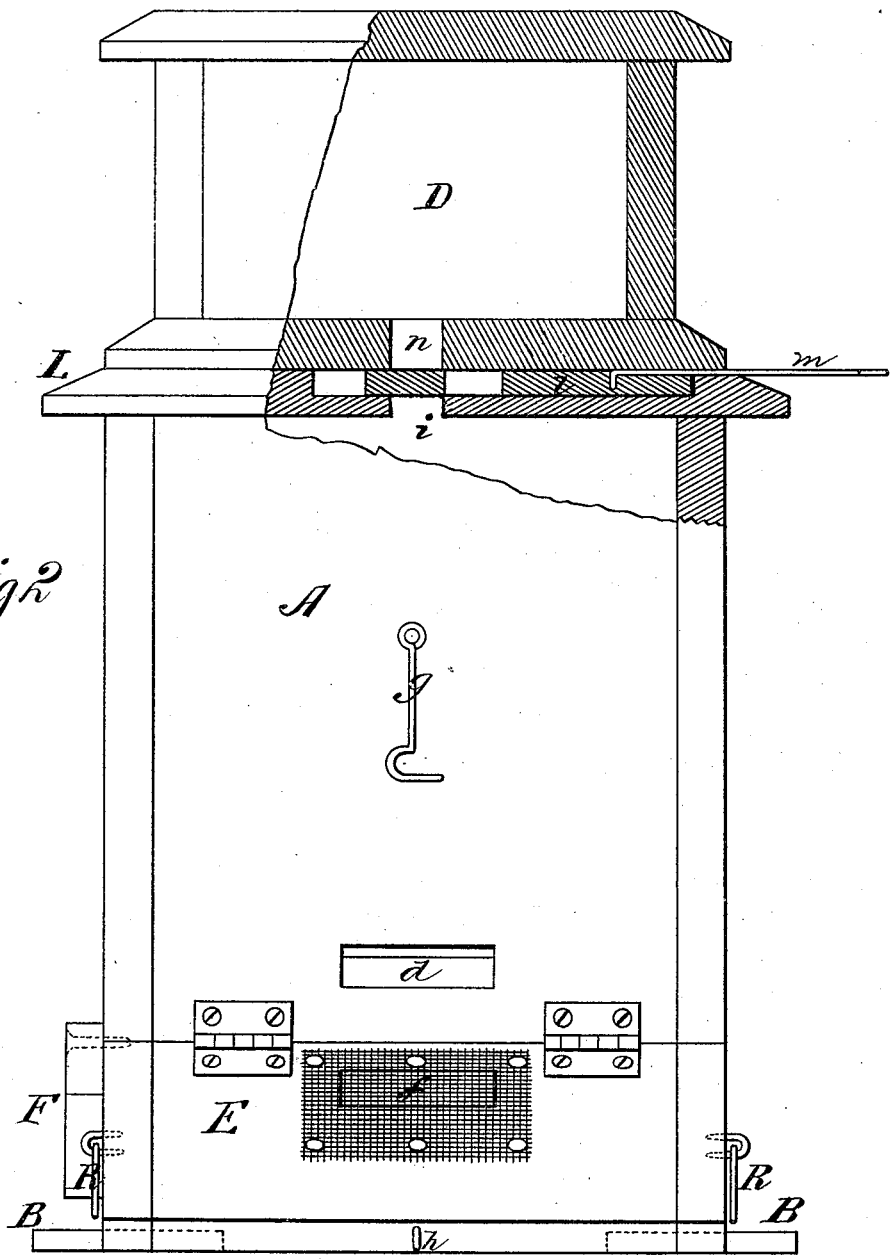
WITNESSES
Villette Anderson
E. H. Bates
INVENTOR
Charles M. Jones
Chipman Hosmer & Co.
ATTORNEYS

UNITED STATES PATENT OFFICE.

CHARLES M. JONES, OF WEST FORK, KENTUCKY.

IMPROVEMENT IN BEE-HIVES.

Specification forming part of Letters Patent No. 180,596, dated August 1, 1876; application filed December 18, 1875.

*To all whom it may concern:*

Be it known that I, CHARLES MADISON JONES, of West Fork, in the county of Christian and State of Kentucky, have invented a new and valuable Improvement in Bee-Hives; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse vertical section of my bee-hive, and Fig. 2 is a longitudinal vertical sectional view of the same.

This invention has relation to improvements in bee-hives of box form; and the nature of the invention consists in combining with the bee-entrance of such a hive a vertically-vibrating hinged ledge, having a gauze-covered opening formed therein, which is adapted to be brought registering with the bee-entrance, whereby a means is provided for excluding moths at the approach of night, and yet allow ventilation to the hive.

In the annexed drawings, the letter A designates the body of my improved hive, which is preferably of rectangular form. This hive is supported upon legs $a$, at a suitable distance from the stand or ground, each leg being received into a preferably metallic cup, B. These cups are designed to be filled with tar or other viscid substance not offensive to the bees, thus insulating the hive-legs, and rendering any attempt of ants or other insects unprovided with wings to reach the same and crawl up the legs absolutely impossible, since they would be previously captured in crossing the trap-cups B. The bottom P of this hive is of angular form, a narrow space, $b$, extending between the converging ends of this bottom from end to end. This slot $b$ is closed upon its under side by means of an angular plate, $c$, (shown in Fig. 1,) which is provided from end to end with narrow-spaced slots $i$, of less width than slot $b$, but in the same line therewith.

A moth, having managed to get into the hive through the bee-entrance $d$ in the side of the hive during the day, will fall down the inclined bottom P into the moth-trap formed by slot $b$ and the perforated plate $c$ below it, where they will be effectually captured. To clean out the trap, a sliding or vibrating door, $e$, (shown in dotted lines, Fig. 2,) will be opened, disclosing an aperture leading thereinto.

In order to prevent moths from getting in after dark, the usual well-known ledge E, upon which the bees land at the hive after a flight, is provided with a gauze-covered opening, $f$, which, the shelf or ledge being hinged to the hive, is adapted to be brought registering with the bee-entrance $d$ by throwing up the shelf. By this means the opening will be closed by the gauze, but yet free and sufficient ventilation be allowed through its meshes. When the ledge is thrown up it may be held to this position by the engagement of a hook, $g$, in the hive with an eye, $h$, upon the said ledge, as shown in Fig. 1.

In order to hold this shelf or ledge, when desirable, in a horizontal position, it is provided upon its lateral edges with pivoted props F, which, when not in use, are capable of being folded up into the same plane with the body, out of the way. The upper end of the body A is closed by a wooden lap, L, provided with a central perforation, $i$, and a sliding door, $l$, which is also correspondingly perforated, and is operated from the outside by means of a handle, $m$, to bring the perforations in the slide and that in the top of the hive registering with each other and with a perforation in the bottom $n$ of a detachable hive-cap, H. By this means access between the body of the hive and its cap may be cut off or allowed at pleasure.

In practice, both the hive and its cap will be provided with a glass plate, $p$, covered at pleasure by hinged doors I I, through which the condition of the colony and of the honey-store may be inspected.

When the cap is full of honey it may be detached from the hive proper and carried to a distance, when in a short time it will be abandoned by the bees, who will return to the hive. The cap may then be rifled of its contents and replaced.

In order that the hive may be prevented from blowing over and held steadily upon a stand or on the ground, the legs are each provided with eyebolt-rings R, by means of which the hive may be lashed to stakes driven into the ground or to pegs on the stand.

What I claim as new, and desire to secure by Letters Patent, is—

In a bee-hive, the combination, with the bee-entrance $d$, of the hinged vertically-vibrating ledge E, having gauze-covered opening $f$, registering with the said entrance, substantially as specified.

In testimony that I claim the above I have hereunto subscribed my name in the presence of two witnesses.

CHARLES MADISON x JONES.
(his mark.)

Attest:
THOS. M. BARKER,
CHARLES x MINTON,
(his mark.)
JOHN x MINTON.
(his mark.)